United States Patent [19]

Seaverns

[11] Patent Number: 5,195,640
[45] Date of Patent: Mar. 23, 1993

[54] METHOD AND APPARATUS FOR CLEANING ABRASIVE BLAST MEDIA

[76] Inventor: Glenn A. Seaverns, 9638 47th Ave., SW., Seattle, Wash. 98136

[21] Appl. No.: 846,220

[22] Filed: Mar. 3, 1992

[51] Int. Cl.⁵ .............................................. B07B 9/00
[52] U.S. Cl. .................................... 209/2; 51/425; 209/33; 209/135; 209/141; 209/143; 209/152
[58] Field of Search ................... 209/2, 31, 32, 33, 24, 209/25, 134, 135, 136, 137, 140, 141, 142, 143, 152; 51/264, 425

[56] References Cited

U.S. PATENT DOCUMENTS

| | | |
|---|---|---|
| 654,290 | 7/1900 | Stebbins . |
| 1,165,866 | 12/1915 | Fraser . |
| 1,499,724 | 7/1924 | Fraser . |
| 2,311,954 | 2/1943 | McLean . |
| 2,696,910 | 12/1954 | Ljungdell et al. . |
| 2,810,991 | 10/1957 | Mead et al. ............................ 51/425 |
| 2,866,547 | 12/1958 | Gladfelter et al. ................... 209/135 |
| 3,263,338 | 8/1966 | Gordon . |
| 3,312,342 | 4/1967 | Brown . |
| 3,397,782 | 8/1968 | Kwong et al. . |
| 3,415,373 | 12/1968 | Pink et al. . |
| 3,543,923 | 12/1970 | Hildred et al. . |
| 3,957,629 | 5/1976 | Paterson .............................. 209/136 |
| 4,288,318 | 9/1981 | Essmann et al. . |
| 4,771,579 | 9/1988 | Giese . |
| 4,913,807 | 4/1990 | Hendricks . |
| 4,984,397 | 1/1991 | Van Leenwen ...................... 51/425 |

FOREIGN PATENT DOCUMENTS

| | | | |
|---|---|---|---|
| 1230809 | 9/1960 | France ................................. 209/24 |
| 19260 | 2/1979 | Japan .................................... 209/24 |

Primary Examiner—H. Grant Skaggs
Attorney, Agent, or Firm—Seed and Berry

[57] ABSTRACT

An apparatus for recovering and cleaning contaminated abrasive blast media. The blast media is transported in a vacuum airstream to a rotatable drum. Within the rotatable drum is a blocking assembly which selectively channels high-velocity air through an upper region of the rotatable drum and restricts the flow of air through a lower region of the drum. The blast media is repeatedly scooped up and dropped to the high-velocity airstream, thus subjecting it to repeated air-washing. The blocking member includes a flexible member which provides both the open channel region and the restriction to the airflow under the force of gravity as the drum rotates. The abrasive blast media is thus assured of being adequately washed even if the air velocity varies randomly during the cleaning of the blast media.

20 Claims, 11 Drawing Sheets

METHOD AND APPARATUS FOR CLEANING ABRASIVE BLAST MEDIA

DESCRIPTION

1. Technical Field

This invention relates to cleaning abrasive blast media for reuse, and more particularly to a method and apparatus for recovering contaminated blast media, cleaning it at a work site, and depositing it in a storage vessel for reuse.

2. Background of the Invention

Cleaning large steel surfaces with abrasive grit material, such as by sandblasting or steel abrasive blasting, is well known in the art. Presently, sand is rarely used as the abrasive grit material, and instead, small steel particles are frequently used as the abrasive blast media.

The advent of steel particles as the abrasive blast media has made it possible to repeatedly use the same blast media several times, provided that the blast media is properly cleaned between each use. Cleaning devices have recently been designed and sold for removing contaminants from used blast media, yet many improvements can be made to the current machines.

One such cleaning device is described in U.S. Pat. No. 4,771,579, incorporated herein by reference. The used blast media is vacuumed up by an operator and carried in an airstream to a cleaning device. Lightweight contaminants are removed by air-washing as the material strikes a target. Large particulate contaminated material is separated by dropping the blast media through apertures in a screen, the apertures being too small for the large contaminants to pass through, and then removing the large particulate contaminants from a garbage chute.

In many systems, the vacuum entraining nozzle is frequently run by an operator who vacuums up the blast media at his own selected, and therefore variable, rate. He may vacuum up varying quantities of blast media from small piles to large piles, thus randomly varying the rate at which air and blast media move through the cleaning sections. At a given time, he may vacuum up a large pile of blast media, significantly decreasing the airflow rate. He may even plug the system with blast media. A lower airflow rate generally results in less efficient cleaning of the blast media. It is desirable to ensure adequate cleaning of the blast media despite random variations in the airflow rate and blast media transport rate.

Recent government regulations have required that the blast media be classified to certain standards of cleanliness. For example, the surface being cleaned may include lead-based paint or other toxic substances. The lead-laden paint must be removed from the blast media according to established classification specifications. Small, even minute, particles of metal that may come off of the surface being cleaned also must be removed. In addition, as the blast media is repeatedly used, up to many hundreds of times, it becomes worn and of reduced diameter. It is desirable to remove from the blast media those particles of blast media which have become so fine that they are no longer useful in the abrasive blast cleaning process.

Meeting the established classification standards for cleanliness of the blast media is sometimes difficult with today's machines, and it is thus desirable to provide a blast media cleaning apparatus and method for performing this cleaning.

SUMMARY OF THE INVENTION

According to principles of the present invention, an apparatus is provided for recovering and cleaning contaminated abrasive blast media for later reuse. The blast media is transported by a vacuum to a rotatable, cylindrical drum. The cylindrical drum is in two sections, a solid wall section and an apertured wall section.

A blocking assembly is positioned within the rotatable drum to selectively restrict the flow of air through one region of the drum while selectively providing an opening that channels air at an increased flow rate through another region of the drum. The blocking assembly includes a segmented flexible member, each segment bending over under its own weight to leave an opening in an upper region of the rotatable drum. The lower segments of the flexible member are held by gravity in a generally vertical orientation in a lower region of the drum. The flexible member thus provides an open air passage in an upper region of the drum to channel a high airflow rate through the upper region and provides a restriction to airflow through the lower region of the drum.

In one embodiment, three blocking assemblies are positioned in series within the rotatable drum, the blast media being required to pass through each of the blocking assemblies prior to exiting from the rotatable drum. A plurality of scoops positioned around the wall of the rotatable drum pick the blast media up as the drum rotates and drop it into the high-velocity airstream in the upper region of the drum to provide repeated air-washings of the blast media.

The airflow rate varies randomly because the operator manually entrains the blast media, and he may elect to vacuum up large piles all at once. Placing a great deal of blast media in the airstream significantly slows the airflow rate, which creates the possibility that the cleaning, which is carried out by high-velocity air-washings, may not be effective, as is one of the problems with the prior art. According to principles of the present invention, placing a restriction within the drum increases the airflow rate through the open regions of the drum, thus channeling the air through the desired section of the drum. The blast media is dropped through the high airflow rate zone to insure that the blast media will be cleansed by the highest velocity air possible within the drum. In addition, the blocking assemblies are positioned in series within the drum to insure that at least one air-washing occurs before the blast media can pass from one blocking assembly to the next. The airflow rate will likely be extremely high to provide a clean air-washing during at least one of the times that the blast media is dropped through the high airflow rate zone. Even if the airflow rate is relatively low while the blast media is passing through the air wash zone, the airflow rate will likely be sufficiently high to provide significant cleansing during at least one of the times that the blast media is dropped through the high airflow rate zone.

According to one embodiment of the invention, the blast media cleaning apparatus includes a series of cleaning stages through which the blast media must pass. A single vacuum source provides the vacuum force for causing the air to flow from the operator controlled vacuum nozzle through the various cleaning stages. For example, the apparatus includes an operator controlled vacuum nozzle for entraining the blast media in the airflow stream. The blast media is carried to a first stage cleaning assembly where contaminants are removed from the blast media. The airflow stream is then carried to a dust collector that removes the contaminants from the airstream to provide clean air within the same series airflow stream. The now clean air is used to carry the once cleaned blast media through a tubing to a second cleansing stage where additional contaminants are removed, again using the same series flow of air for the second cleansing stage. The airflow is then passed through a second dust collector to remove contaminants from the air while the now cleaned blast media is discharged into a hopper for reuse within the system.

The present invention provides the advantage that the blast media is cleaned to the selected standard regardless of variations in the airflow rate. Thus, even if the operator suddenly vacuums up a large pile of blast media, thus reducing the airflow rate considerably, the structure and method of the present invention insures that the contaminants will still be removed from the blast media that is then being cleansed in the system.

DETAILED DESCRIPTION OF THE INVENTION

Figure 1:
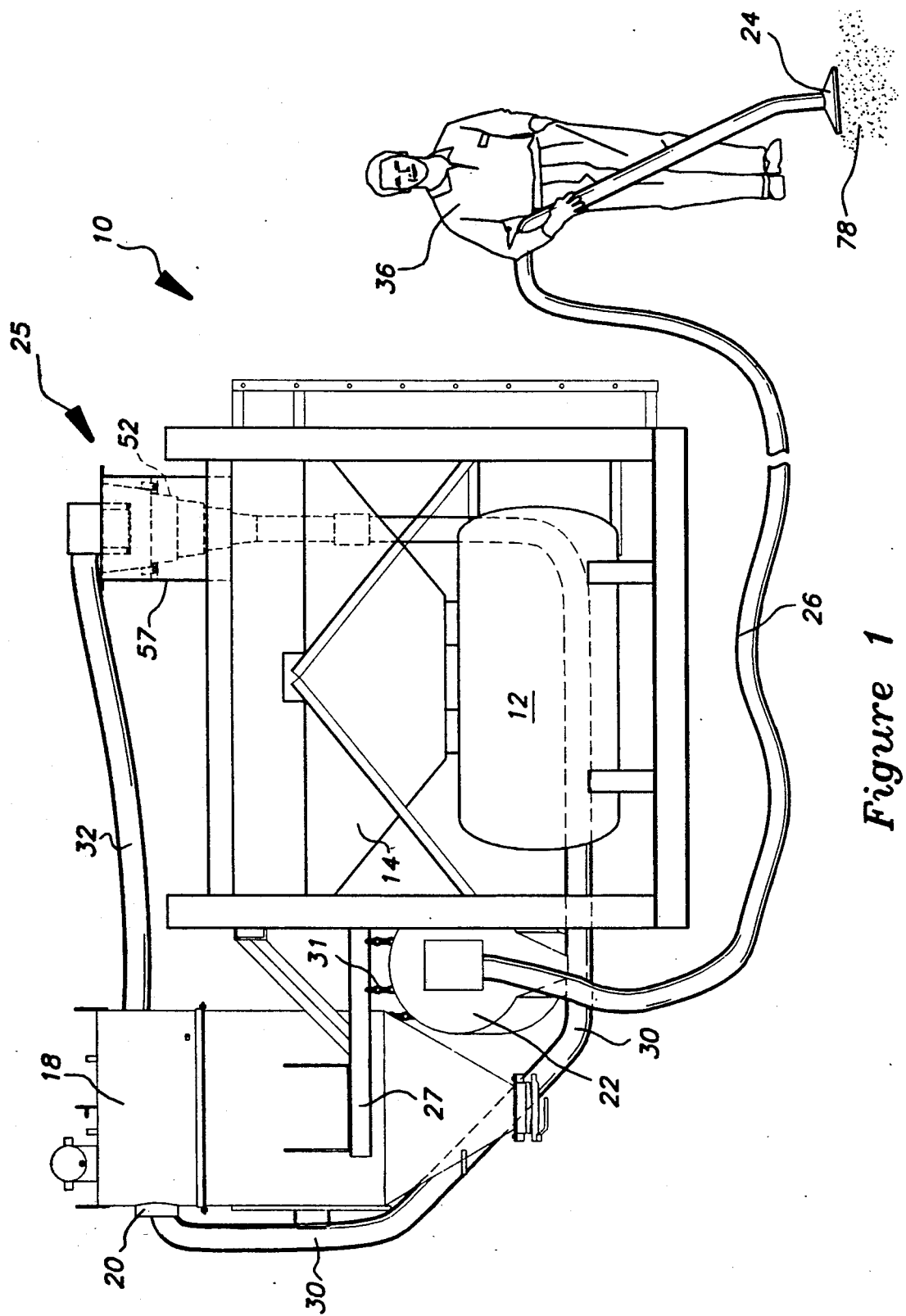
FIG. 1 is a front elevational view of abrasive blast media cleaning apparatus according to principles of the present invention.
Figure 2:
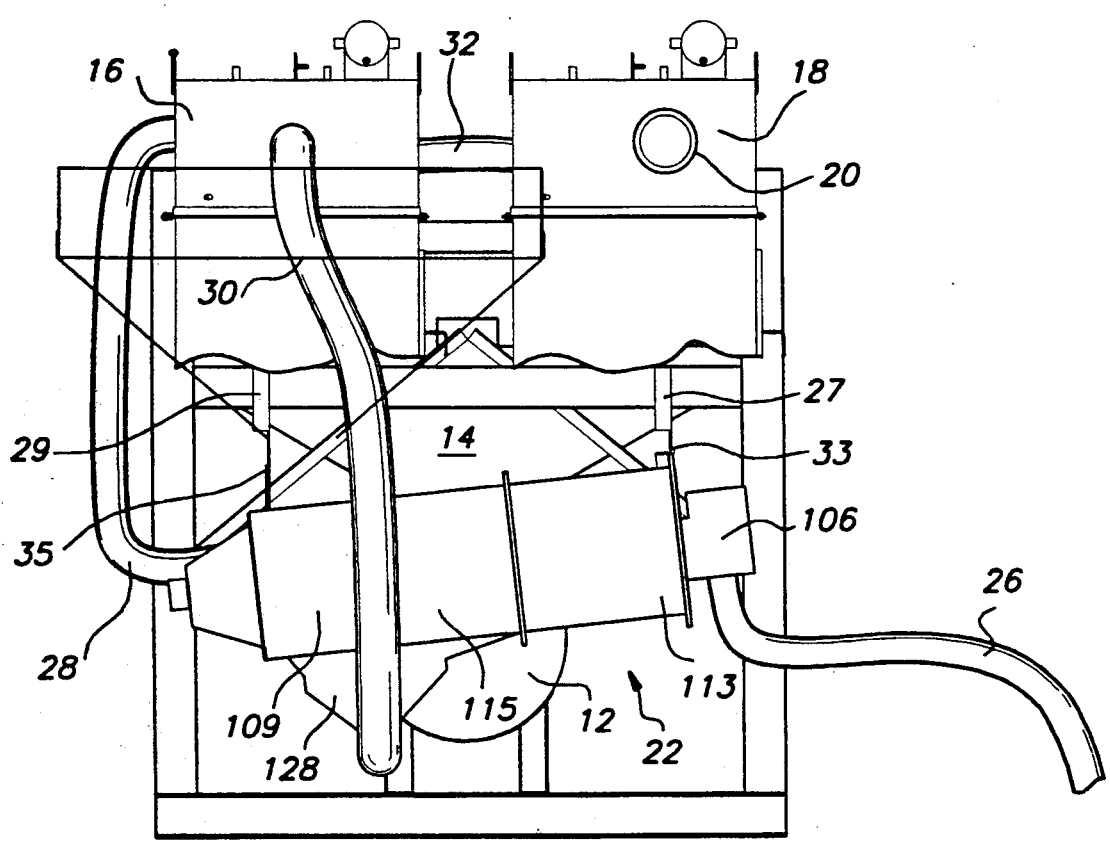
FIG. 2 is a side elevational view in partial breakaway of the abrasive blast media cleaning apparatus of FIG. 1.

As shown in FIGS. 1 and 2, the abrasive blast media cleaning apparatus 10 has a vacuum source 20 providing the vacuum power to draw contaminated blast media 78 into a vacuum nozzle 24. An operator 36 manually controls the vacuum nozzle 24 to entrain contaminated blast media 78 in the vacuum airstream. The blast media 78 is carried through a first tubing 26 to a first cleaning stage 22 where contaminants are removed from the blast media. The entraining airstream containing the removed contaminants is drawn via tubing 28 through a first dust collector 16 where the air entrained contaminants are removed from the airstream. The once cleaned blast media 78 falls out of the airstream and into a transporting tubing 30. The clean air exiting from the first dust collector 16 is drawn through the tubing 30 to entrain the once cleaned blast media 78 and carry it to a second cleaning stage 25. The blast media 78 is cleaned a second time in the second cleaning stage 25. The airstream containing the removed contaminants is transported via tubing 32 to a second dust collector 18 where the dust is removed a second time from the airstream. The now twice cleaned blast media 78 is discharged from the second cleaning stage into a storage hopper 14 and from the storage hopper 14 is deposited into a blast vessel 12 in which it is stored in preparation for use in the next cleaning operation.

Only a single vacuum power source 20 is provided and all of the cleaning stages, dust collectors, and tubings are coupled in series with the vacuum power source drawing the air in series through each of these devices. The vacuum power source 20 may be any powerful vacuum of a type well known in the industry and any vacuums that are capable of entraining steel blast media and maintaining an airflow rate in the range of 600-1150 cubic feet per minute is acceptable. The vacuum source 20 thus has sufficient strength to entrain and carry the contaminated blast media 78 from the ground and through the various cleaning stages until it falls into hopper 14.

As the operator 36 vacuums up the contaminated blast media 78, he randomly varies the rate at which he vacuums up the blast media, and this randomly varies the airflow rate within the various tubings and cleaning stages. For example, if the operator 36 suddenly vacuums up a large pile of contaminated blast media, the tubing 26 becomes substantially filled with blast media as it is pulled in by the vacuum, decreasing the airflow rate. If the pile of blast media 78 is sufficiently large, the nozzle 24 may become plugged, decreasing the airflow rate to approximately zero for a brief period of time until the operator clears the nozzle 24. In addition, as the operator entrains contaminated blast media 78, he may entrain small piles at a slow rate and then suddenly entrain large piles, so that the airflow rate varies randomly.

The airflow rate through the first cleaning stage 22 and the second cleaning stage 25 will thus also vary randomly because the airflow through the two cleaning stages is a series airflow path from the nozzle 24 through to the vacuum source 20. If the vacuum nozzle 24 is suddenly plugged for a brief moment, the airflow rate within the first cleaning stage 22 and the second cleaning stage 25 will suddenly decrease, and may approach zero. Similarly, as small and large piles of blast media are entrained, the airflow rate through the cleaning sections 22 and 25 will increase or decrease accordingly, depending upon the amount of blast media which is being entrained in the airstream through the system at that time.

The random variation of airflow rate through the cleaning stages may present problems in assuring adequate cleaning of the blast media 78 and the apparatus is constructed to ensure that the blast media is always adequately cleaned to the established classification of cleanliness. The cleaning stages 22 and 25 rely upon air-washing by the air supply of the vacuum source 20 to remove lightweight contaminants, such as fines, from the blast media. The structure is designed to ensure that sufficient air-washing of the blast media occurs regardless of variations in the airflow rate through the cleaning stages 22 and 25, as will now be explained.

Figure 3:
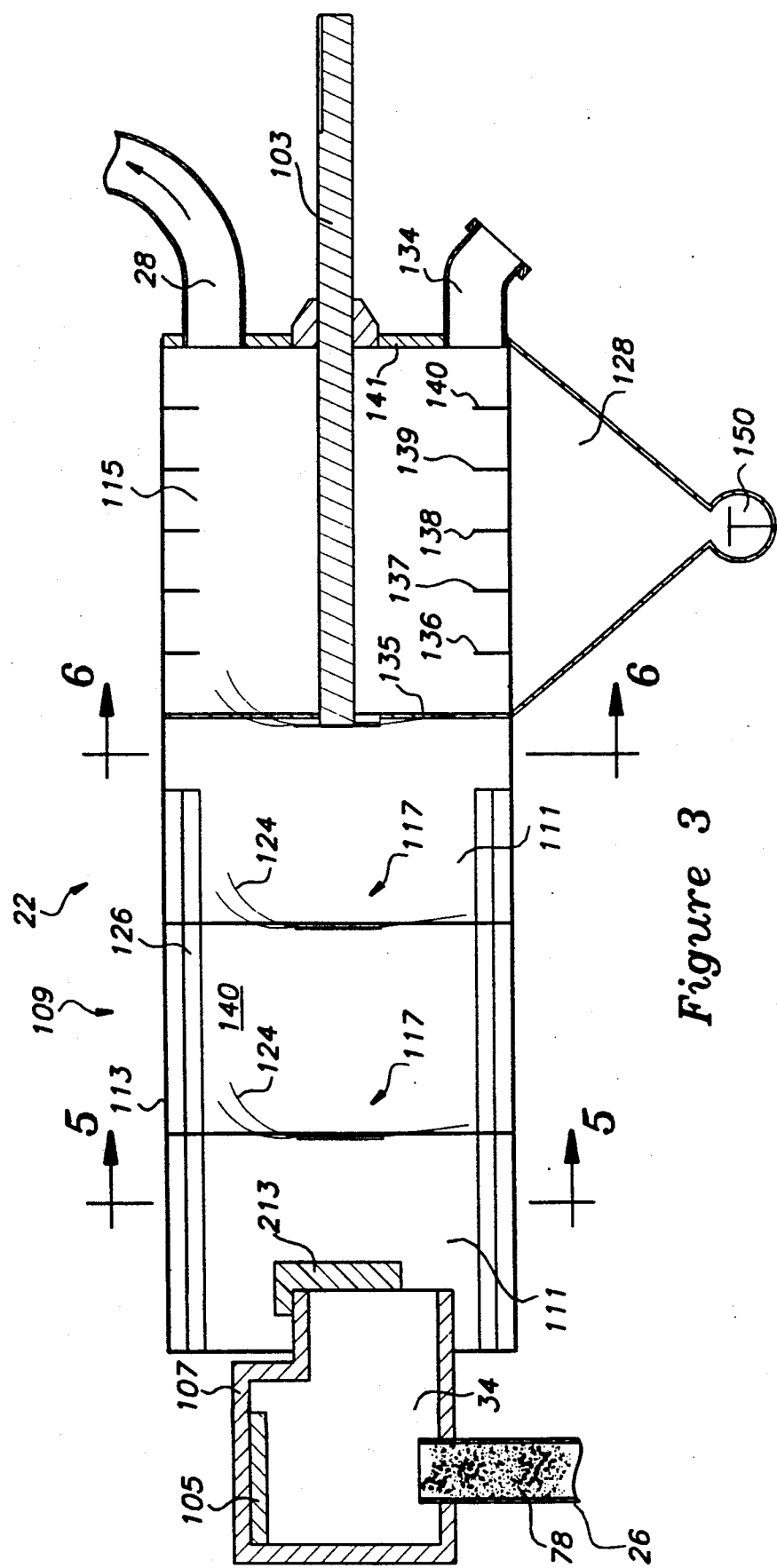
FIG. 3 is a cross-sectional view of the rotatable drum of FIG. 1.

As illustrated in FIG. 3, the first cleaning stage 22 is a rotatable drum connected to a shaft 103 for rotation. The details of the motor drive assembly for rotating the drum are disclosed in U.S. Pat. No. 4,771,579 ('579), incorporated herein by reference, and in fact, the drum 109 can, in some embodiments, be interchanged with the drum shown in the '579 patent in structures existing in the field to provide the improved invention in currently existing structures.

The cleaning within the rotating drum 109 is carried out as follows. Contaminated blast media 78 exits the tubing 26 while entrained in the stream and impacts upon a target 105 within an inlet 107 of the rotatable drum 109. After the blast media 78 impacts the target 105, a shield member 213 positioned between the inlet 107 and the drum 109 knocks the blast media down onto a lower region 111 of the drum 109.

The drum 109 is comprised of two sections, a solid wall section 113 and an apertured wall section 115. The solid wall section 113 and the apertured wall section 115 are bolted together in a conventional manner to form a single rotatable drum 109.

The solid wall member 113 is preferably comprised of a solid sheet of metal without holes or openings. A sheet of 14-gauge steel having a diameter of approximately 20 inches has been found suitable for the solid wall section 113 of the drum 109, although other materials are also acceptable.

Within the solid wall member 113 are mounted two blocking assemblies 117. A third blocking member is affixed at the coupling between the apertured wall section 115 and the solid wall section 113, this blocking member being attached to the rotatable shaft 103.

Figure 4:
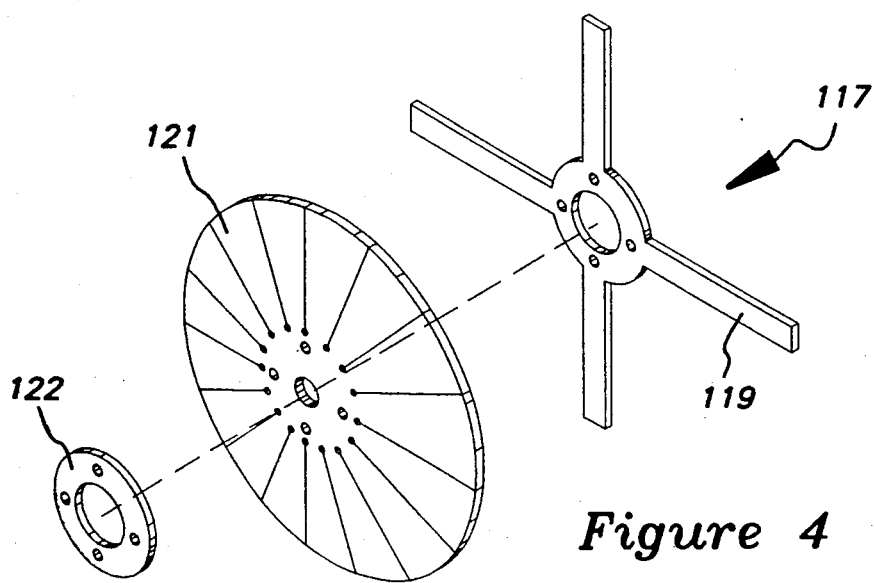
FIG. 4 is an exploded, isometric view of a blocking assembly from within the drum of FIG. 3 constructed according to principles of the invention.
Figure 5:
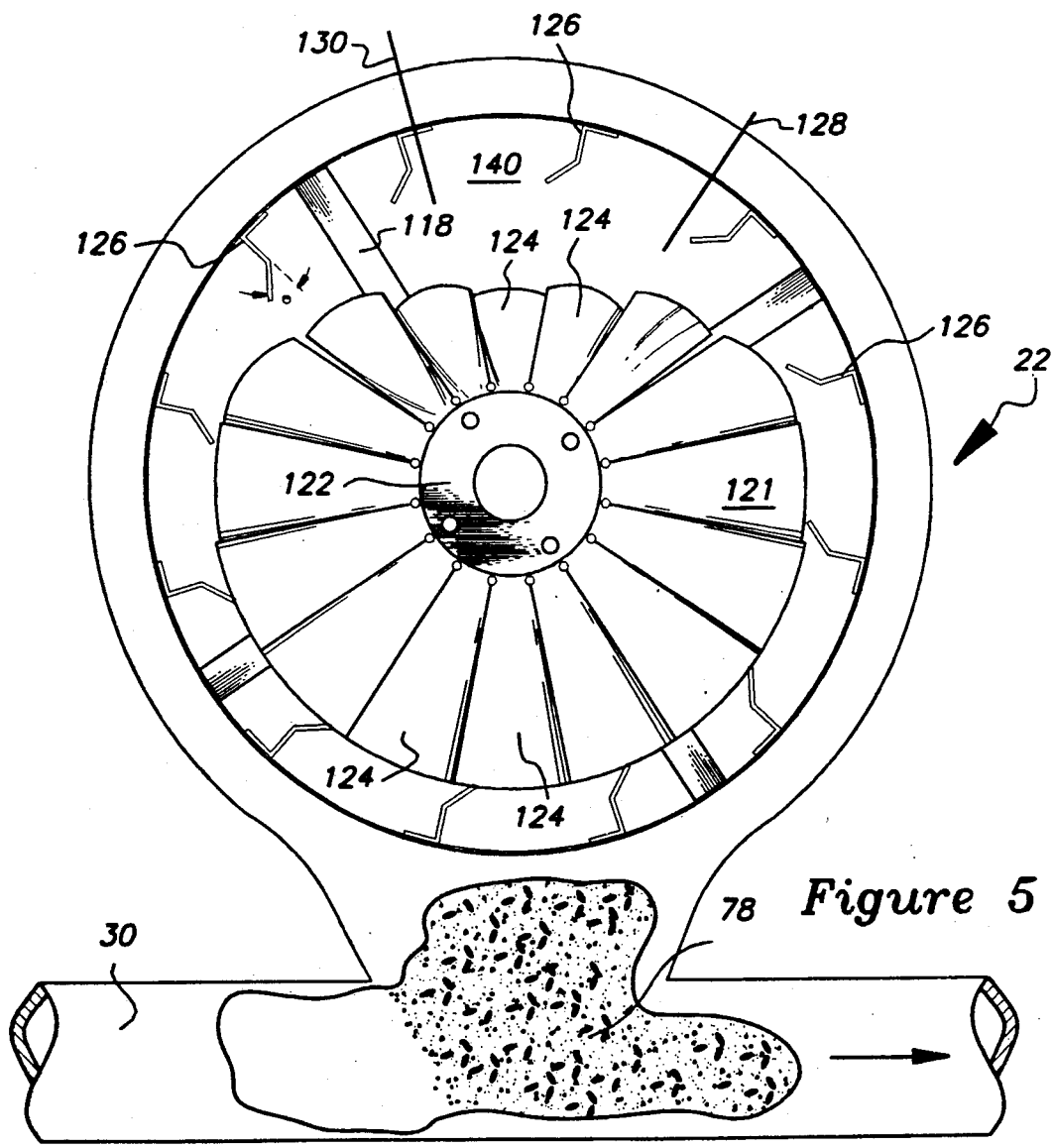
FIG. 5 is a cross-sectional view taken along lines 5—5 of FIG. 3.

As shown in FIGS. 4 and 5, the blocking assemblies 117 include a mounting frame 119, a flexible member 121, and a retaining bracket 122. The mounting frame 119 is affixed to the solid walls of wall section 113 to support the flexible member 121, and the bracket 122 retains the flexible member 121 on the mounting frame 119.

As illustrated in the cross-sectional views of FIGS. 3 and 5, the flexible member is a disk having a plurality of cuts to form the individual segments 124. The segments 124 are sufficiently flexible that they bend under their own weight when the flexible member 121 is supported in the center. Each of the segments 124 is moveable independent of the other segments 124 of the flexible member 121. With the flexible member vertically supported, the segments 124 at the top portion of the disk have sufficient weight that they will bend over and flop down somewhat, as shown in FIGS. 3 and 5. However, the segments 124 that are in the bottom region of the disk are held straight by gravity and are retained substantially vertical, being held vertical by their own weight. As the drum 109 rotates, different ones of the segments 124 are at the top of the disk, and thus will flop over while the segments 124 which were previously at the top of the disk that have rotated to the bottom of the disk will be held in a generally vertical and flat orientation.

The design of the flexible member 121 advantageously provides a selected channeling of air through the rotating drum 109. Airflow through the drum in the upper region 140 is encouraged and specifically permitted by the open space provided as the segments 124 at the top of the disk bend downward under their own weight. Additionally, the vertically extending segments 124 at the bottom of the disk provide a restriction to airflow in the lower region 111 of the drum. The result is that more air is channeled for flow at a high velocity through the upper region 140 of the drum and air is generally restricted from flowing through the lower portion 111 of the drum as the drum rotates, regardless of the particular angular orientation of the drum 109.

A plurality of scoops 126 are affixed to the interior wall of the solid wall portion of the drum 113, and extend towards the inside of the drum. The scoops 126 extend longitudinally along the length of the solid wall portion, as best shown in FIGS. 3 and 5, creating a trough which carries the contaminated blast media 78.

As the drum 109 rotates, the contaminated blast media 78 is carried in the scoops 126 towards the upper region 140 of the drum 109 and when the scoop 126 reaches approximately the one o'clock position the contaminated blast media 78 begins to fall from the scoop 126. The blast media 78 continues to fall from the scoop 126 through the twelve o'clock position and, by the time the scoop 126 reaches the eleven o'clock position, marked as 130 in FIG. 5, all of the blast media will have fallen from the scoop 126.

As the blast media 78 falls from the scoop, the strong airflow under the negative vacuum pressure flowing through the drum 109 will subject the blast media to repeated air-washings. Fines, small particulates, paint flakes, and lightweight matter are removed from the blast media as it falls through the air.

As shown in FIG. 5, the end region of the scoop 126 is bent at a selected angle $\theta$ to ensure that the blast media 78 is dropped into the high-velocity airstream passing through the drum 109. Based upon the angle of repose of steel particles for the blast media 78 and having the highest velocity for the airstream in the upper region 140 of the rotating drum 109, and angle $\theta$ of approximately 45° is preferred. With an angle $\theta$ of approximately 45°, significant portions of the blast media are retained by the scoop 126 until it passes approximately the one o'clock position and then it begins to fall from the scoops and into the high-velocity airstream.

According to an alternative embodiment, the scoops 126 are at an angle as they extend longitudinally along the wall 113. The scoops 26 are thus at a very slight spiral, similar to the rifling of a barrel. The amount of spiral of each scoop 126 is selected such that the end of one scoop is spaced just slightly from the beginning of the next scoop along a straight line from one end of the drum to another. The spiralling of the trough 126 provide significant advantages now possible in the scoops in the prior art. As will be appreciated, With each scoop slightly angled, on a spiral longitudinally along the drum 26, as the leading edge of the trough 126 passes through the one o'clock position, blast media will be deposited into the airstream in the upper portion 140. The back end of the trough 126 will not yet be at the one o'clock position, but rather will be closer to the two o'clock position and therefore the blast media will not begin to drop from the back end portions of the trough 126. As the drum 109 continues to rotate, the remainder of the trough will gradually move to the one o'clock position as the leading edge of the trough approaches the twelve o'clock position. When the leading edge of the trough 126 is approximately at the twelve o'clock position, the trailing edge 126 will be approaching the one o'clock position and blast media Will begin to drop from the trailing edge of the trough 126. The blast media will therefore be dropping gradually, in a spread out pattern from each trough 126. If the troughs are aligned straight with the axis of the rotating drum 109, the blast media will be dumped all at once along the entire length of the trough. The blast media will thus be dumped as a large pile of material into the airstream to the upper portion 140. While having the troughs straight does provide some cleaning of the blast media, significantly more cleaning is provided when the troughs 126 are positioned on a spiral with the blast media being gradually dropped into the airflow 140 as the drum rotates. Thus, the blast media carried on a single trough 126 will be gradually and smoothly dropped into the higher flow section 140 and spread out through the airflow section 140 rather than being bunched together. Just as one trough 126 has completed its dumping, the leading edge of the next trough 126 will enter the dump zone and will also gradually dump its entire load in the higher flow stream as it moves from the one o'clock through the twelve o'clock position. Having the troughs on a spiral advantageously permit a continuous and uniform flow of blast media particles into the cleansing airstream. It also avoids the problems of the prior art which dump one full trough at a time and have a space of no blast media and then dump another trough followed by a space with no blast media being dropped. This alternative embodiment of having spiralled troughs 126 can therefore be used in the embodiment of FIG. 5 or in rotating drums which have a different internal construction.

In the prior art, the angle $\theta$ was 90°, which resulted in none of the blast media starting to fall at the one o'clock position and a large body of the blast media still being retained by the scoops 126 pass the eleven o'clock position, with most of the blast media being dropped from the scoop well after it had passed through the upper region of the drum. The shape of the scoop according to principles of the present invention ensures that the blast media will be dropped into the highest velocity of airflow for increased cleansing of the blast media. Of course, if the drum 109 is designed to place the higher velocity airflow at another part of the drum, such as to one side, the angle $\theta$ may be changed, to be lower or greater to provide the desired air-washing of the blast media 78.

As the blast media falls from the upper region 140 of the drum 109 towards the lower region 111, the blast media itself is also carried forward by the airstream. However, the blast media, being significantly heavier, will not be carried forward nearly as far as the lightweight particular matter and, in many cases will impact the flexible member 121. When the blast media 78 impacts the flexible member 121, it will drop immediately to the lower part of the drum 111 to be scooped up again and dropped into the flowing airstream for repeated cleaning. The blast media may be picked up and dropped several times, preferably at least three times, prior to exiting the solid wall portion 113, thus ensuring that all blast media is subjected to a minimum of three air wash cycles prior to exiting the solid wall portion.

The present invention increases the cleaning of the blast media despite random and wide variations in the airflow rate. As previously mentioned, the airflow rate randomly varies over a very wide range, from very low to extremely high, depending upon the operator-induced action as he entrains blast media via the nozzle 24. If the airflow rate is extremely low, the air-washings are generally not as effectively in removing lightweight fines from the blast media. A significant advantage is provided by the blocking assembly 117 having the flexible member 121. The majority of the air is channeled through the upper region 140 of the drum 113 for increased removal of the contaminants from the blast media. Because the flexible member 121 is restricting the airflow through one part of the drum 109, the air velocity will be higher through the upper region 140, it being smaller in diameter than the entire drum. Even though the airflow rate may be decreased by operator action, there is still a somewhat higher airflow rate through the open selected region 140 of the drum 109 than would otherwise be available without the flexible member 121. In addition, the scoops are advantageously shaped to ensure dropping of the blast media into the high airflow rate zone to increase the cleansing of the blast media by the passing airstream.

A further advantage of the structure of the present invention is that the blocking member acts as a restriction to permitting blast media to pass through the drum, particularly with low airflow rates. As illustrated in FIG. 2 (and shown in the '579 patent), the drum 109 is mounted at a selected angle so that the blast media falls from the inlet 107 towards the outlet 128 under the force of gravity. An additional force carrying the blast media forward is the airflow. For low airflow rates, the blast media will not be carried forward a significant distance as it is dropped from the upper region 140 to the lower region 111. Further, the blast media may impact the blocking assembly 117 and the flexible member 121 as it is carried through the air, thus knocking it down to the lower portion 111 of the rotatable drum to prevent its further progress through the drum until the scoop picks it up for the next air cleaning. The flexible member 121 just touches the scoops 126 to block the passage of piles of blast media 78 that are above the scooper 126. Thus, the majority of the blast media cannot pass through the drum without passing each of the three blocking assemblies 117 in series. The blast media 78 will likely be air washed a minimum of three times prior to exiting from the rotatable drum 109. During any one or more of these potential air-washings, the airflow rate may possibly be quite low because of the random variations induced by the operator during the vacuum entraining of the blast media 78. However, there is a high likelihood that during at least one or more of the air-washings, the airflow rate will be sufficiently high to provide a good and thorough cleansing of the blast media 78. Thus, at least one good cleansing of the blast media 78 is assured before it passes out of the rotatable drum 109. When the airflow rate is relatively low, the blast media itself passes much more slowly through the rotatable drum, thus increasing the number of times that the blast media will be dropped and increasing the likelihood that one or more high velocity air-washings will occur prior to the blast media exiting from the drum.

After the blast media 78 passes through the blocking assemblies 119, and moves out of the scoops 126 and the solid wall section 113, it enters the apertured wall section 115. The apertured wall section is constructed of any material which will have apertures therethrough, such as perforated steel plate, wire mesh, a screen, or the like. A suitable material which has been found acceptable is wire mesh having apertures just slightly larger than the abrasive blast media. The apertures are sufficiently small that large particulate contaminants do not pass through the apertures but are carried to a garbage outlet 135. The once cleaned abrasive blast media 78 falls through the apertures into an outlet 128 and into a tubing 30.

Figure 6:
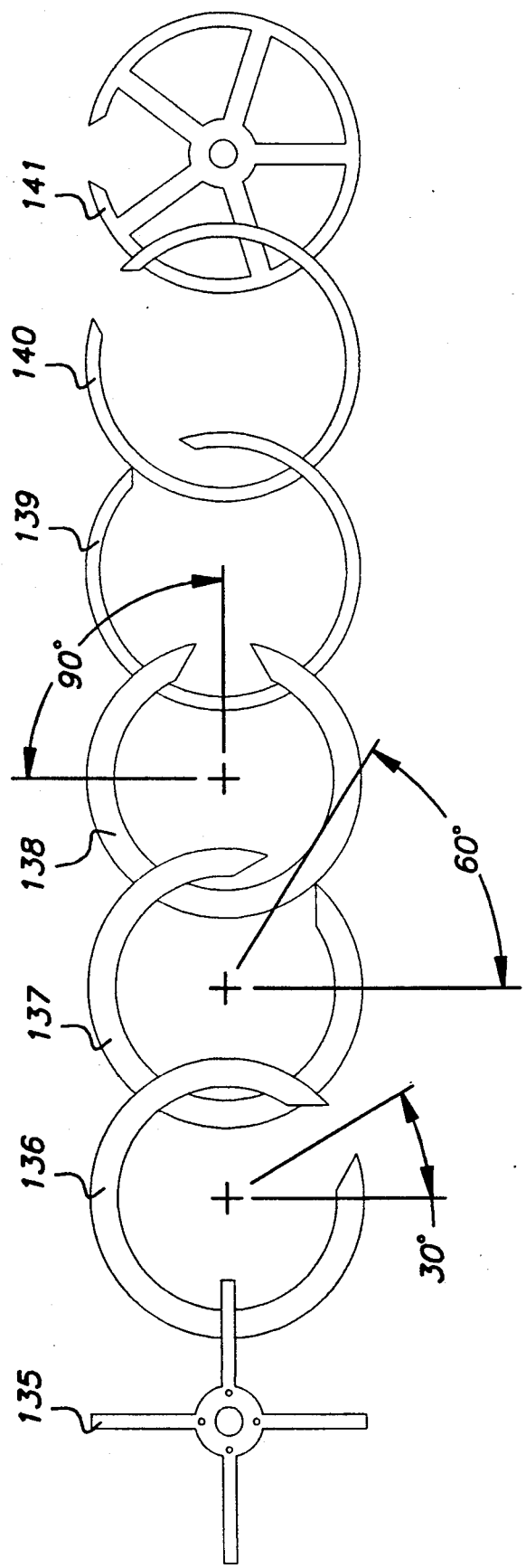
FIG. 6 is an exploded, cross-sectional view taken along lines 6—6 of FIG. 2 illustrating the baffle members according to principles of the invention.

A series of baffles 135-141 positioned within the apertured wall section 115 slow the flow of blast media 78 through the apertured wall section 115 to aid in cleaning the blast media 78. As best shown in FIG. 6, the baffles 135-141 contain openings through which the blast media may freely pass. The opening of one baffle is offset 30° from the baffle on either side of it. For example, material passing through baffle 136 will strike baffle 137 and remain within the apertured wall section 115 for 330° of the revolution before it can pass through the opening in baffle 137. Similarly, the blast media will then abut against baffle 138 and remain within the apertured wall section 115 for the majority of a complete revolution. Of course, during the entire time that the drum is rotating, the blast media is falling through apertures in the apertured wall section 115 and into the outlet 128, as has been described, so that preferably all of the blast media has exited from the apertured wall section 115 prior to reaching the final baffle 141. The baffles 135-141 thus slow the passage of blast media to permit repeated cleaning as the blast media tumbles on the apertured wall section 115 and to ensure that all of the blast media fall through the apertures before reaching the garbage outlet 134.

As shown in FIGS. 1 and 2, the drum cleaning section 109 is angled so that the abrasive blast media 78 moves through the drum under the force of gravity. Preferably, the angle at which the drum 109 hangs is variable. The drum 109 is constructed to have a variable angle of incline by having the drum suspended from frame members 27 and 29. Having the drum suspended from frame members rather than supported from below significantly increases the ease of changing the angle of incline of the drum 109. In one embodiment, as shown in FIG. 1, the drum is suspended by chains 31 from the frame members 27 and 29. The length of the chains can easily be adjusted to vary the drum's incline so that it has a selected angle. In the embodiment as shown in FIG. 2, the drum 109 is connected to a hinge 33 at a front portion thereof and through a bracket 35 at a rear portion thereof. The hinge 33 permits the drum 109 to rotate to any selected angle and the bracket 35 contains a plurality of apertures so that the drum 109 may be bolted at the desired inclined angle.

As will be appreciated, the angle of incline of the drum 109 is selected to move the blast media through the drum 109 at a desired speed. For a steeper incline, the blast media will pass more quickly through the drum 109, the force of gravity being stronger. However, if the blast media is exceptionally dirty or additional conditions warrant, the angle of incline of the drum 109 is varied so that it is generally horizontal and blast media will pass very slowly through the drum 109. The angle of incline of the drum 109 is thus selected based on need and is variable, either by an operator or a person maintaining the machine to produce the desire amount of cleansing and flow speed of the contaminated blast media 78 to the drum 109. Of course, a helical screw member on the inner surface of the drum 109 could be used to advance the blast media at a preset and desired rate to the drum 109, if desired.

This particular arrangement of baffles 135-141 is well known in the art and was used in the device of the '579 patent. It is illustrated herein to provide a more complete understanding of the interior of the drum 109, according to a preferred embodiment of the present invention.

The air-entrained fines 82 exit in the upper region 140 at the back of the rotating drum 109 via a tubing 28. The air exiting the tubing 28 will be extremely dirty, having considerable contaminants 82 therein. This air is drawn through the first dust collector 16 (as shown in FIGS. 1 and 2) to remove all of the fines carried by the air. Clean air exits from the first dust collector 16 via conduit 30. The now clean air flowing within tubing 30 is channeled under the outlet from the tubing 128 to once again entrain the abrasive blast media 78 to carry it to the second cleaning stage 25.

In one embodiment, the tubing 30 includes a "T" shaped spacing member to ensure that there is always an open space within the tubing 30. One of the problems of some prior art tubings is that the tubing itself may become so filled with blast media as it exits from the drum that the tubing is plugged, thus stopping the airflow. The "T" shaped member serves to spread the abrasive blast media around the outer edges of the tubing 30 and, based on the angle of repose of the blast media, ensures that there is always an open space directly underneath the horizontal bar of the "T" so that the tubing 30 can never be completely plugged. The use of a "T" spacing member within a tubing is well known in the prior art.

Figure 7:
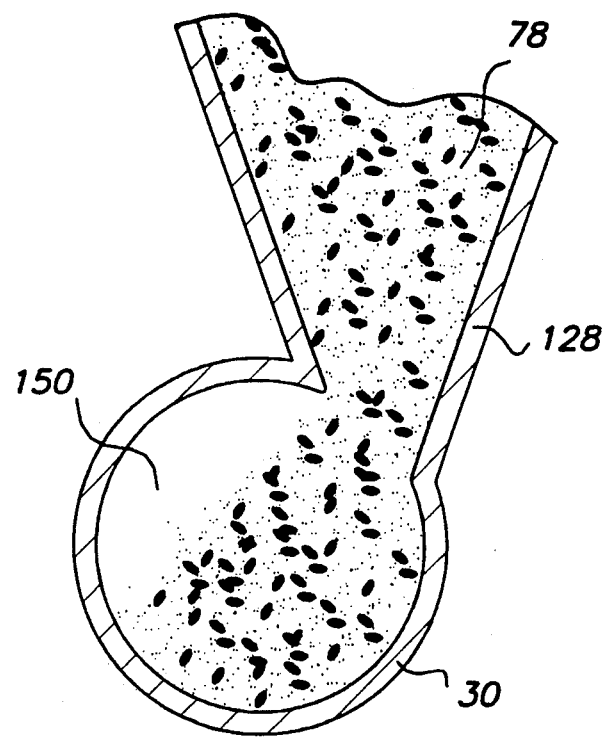
FIG. 7 is a cross-sectional view of a transport tubing constructed according to an alternative embodiment of the invention.

FIG. 7 illustrates an alternative embodiment for a tubing 30 which ensures that an open space is always maintained within the tubing. According to this embodiment, the inlet into the tubing 30 is offset from the top of the tubing. As the blast media falls into the tubing 30, it can fill only a section of the tubing and then the entrance is blocked off so that no more blast media may enter the tubing. The top portion 150 of the tubing 30 will always remain open because the blast media enters below the top of the tubing. Because the steel blast media 78 has a selected angle of repose, the opening 150 will extend at this angle of repose from the inlet into the tubing 30 to the bottom wall, as shown in FIG. 7. Thus, there will always remain an open space 150 within the tubing 30 through which air may be drawn and the tubing 30 will not be plugged even if the outlet 128 becomes completely filled with blast media 78.

The blast media is then cleaned a second time cleaning stage 26, as will now be explained.

Figure 8:
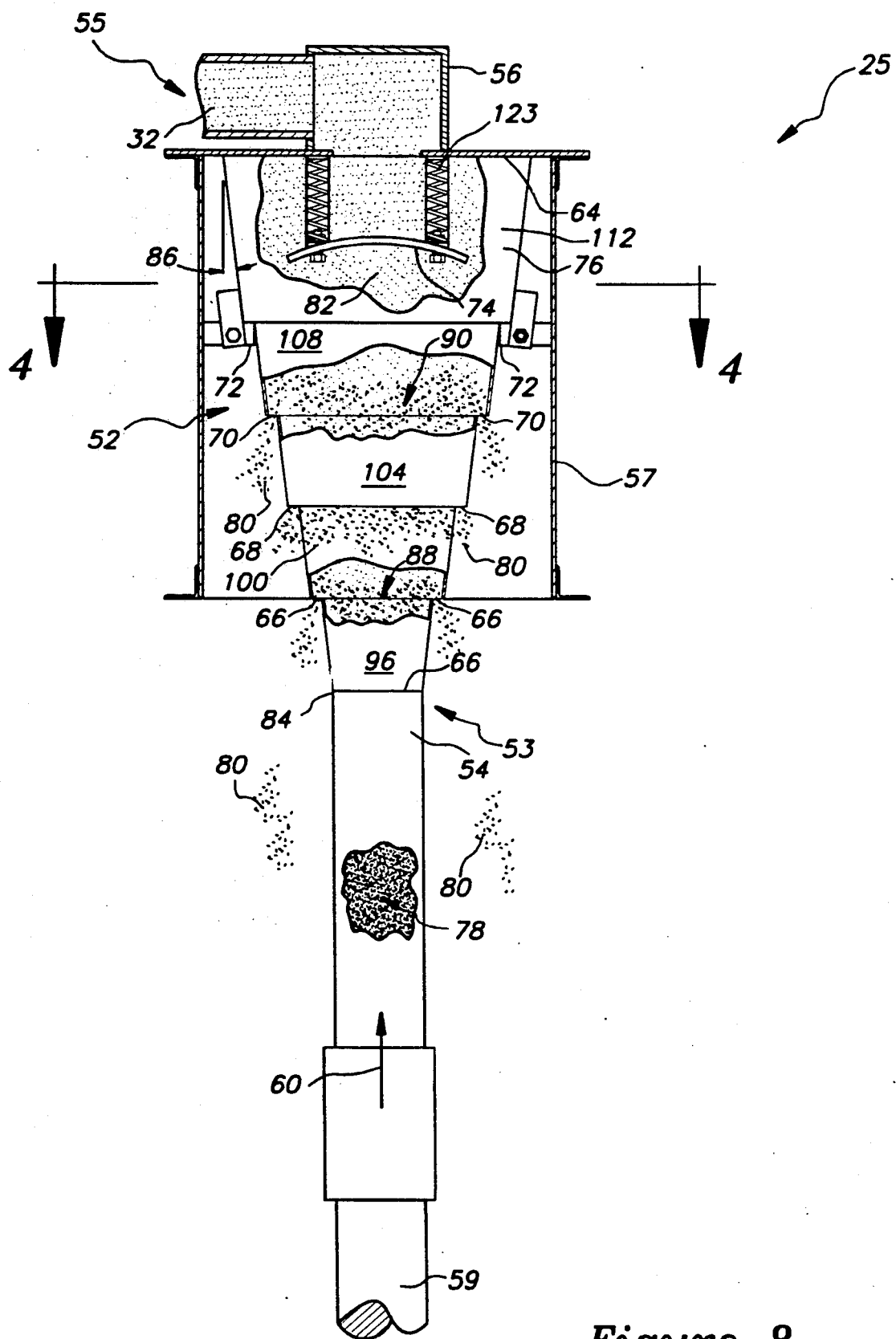
FIG. 8 is a side elevational view of a conical cleaning section.

As illustrated in FIG. 8, the second cleaning stage 25, for further separating blast media 80 from contaminants 82 includes a conical cleaning section or cone 52, an inlet port 54 at a bottom region 53 of the cone 52, and an outlet port 56 at a top region 55 of the cone 52, the outlet port 56 being coupled to vacuum source 20. A substantial portion of cone 52 is enclosed in a casing 57.

Figure 10:
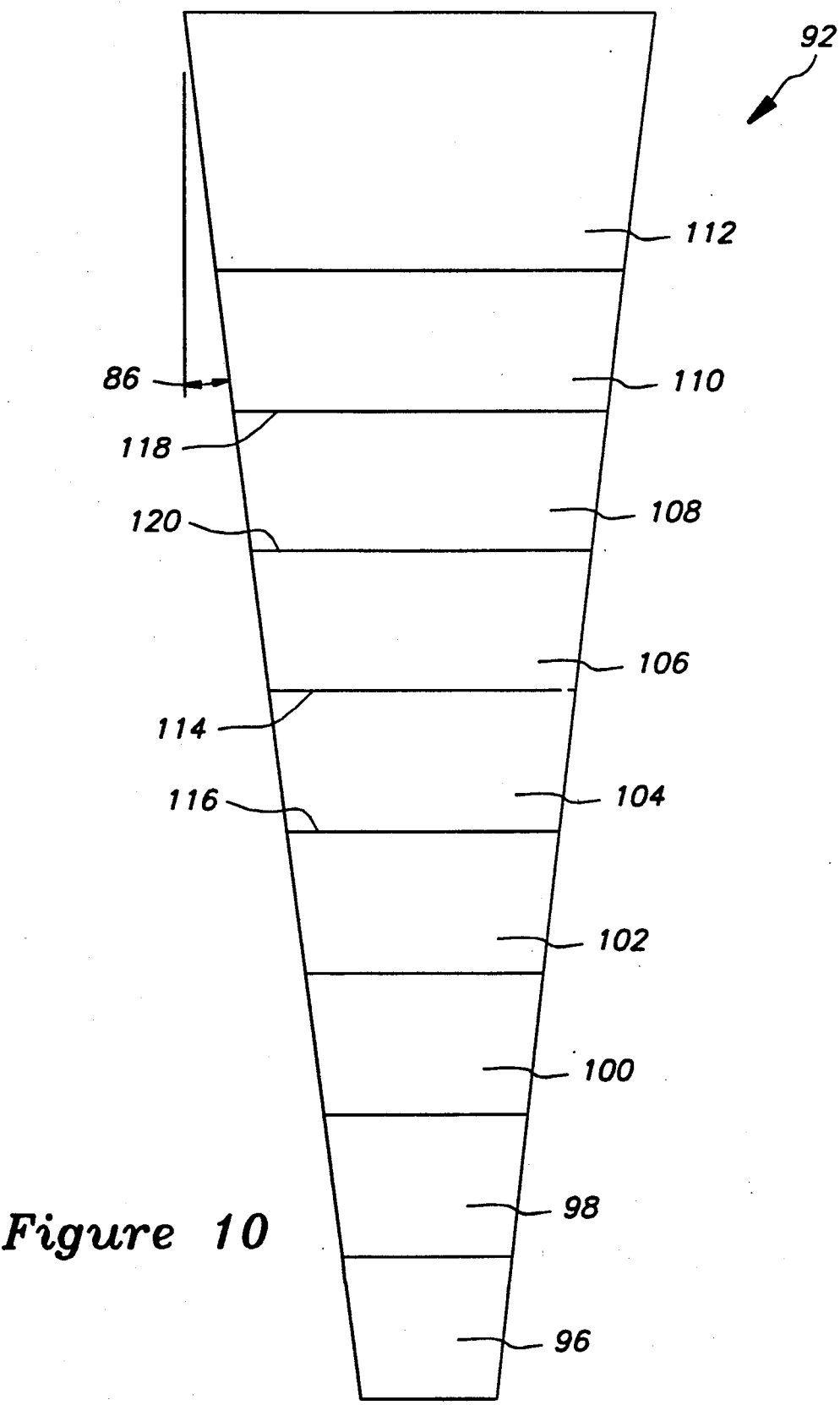
FIG. 10 is a side elevational view of an integral cone illustrating the method of constructing the conical cleaning section.

As illustrated in FIG. 10, the cone 52 illustrated in FIG. 8 is constructed by first constructing an integral cone 92. The integral cone 92 is then segmented into individual conical members, as illustrated by elements 96 through 112 in FIG. 10.

As further illustrated in FIG. 10, each conical member 96-113 has a large diameter region at the top of the conical member and a small diameter region at the bottom of the conical member. For example, conical member 104 has a large diameter region 114 and a small diameter region 116, and conical member 108 has a large diameter region 118 and a small diameter region 120.

After segmenting integral cone 92, selected conical members are affixed to each other to form a second cone as illustrated by the cone 52 in FIG. 8. Although it will be appreciated by those skilled in the art that the selection of conical members may vary, for example, selecting every other conical member or selecting every third conical member, in the preferred embodiment, alternating conical members are affixed to each other, namely conical members 96, 100, 104, 108, and 112.

Figure 9:
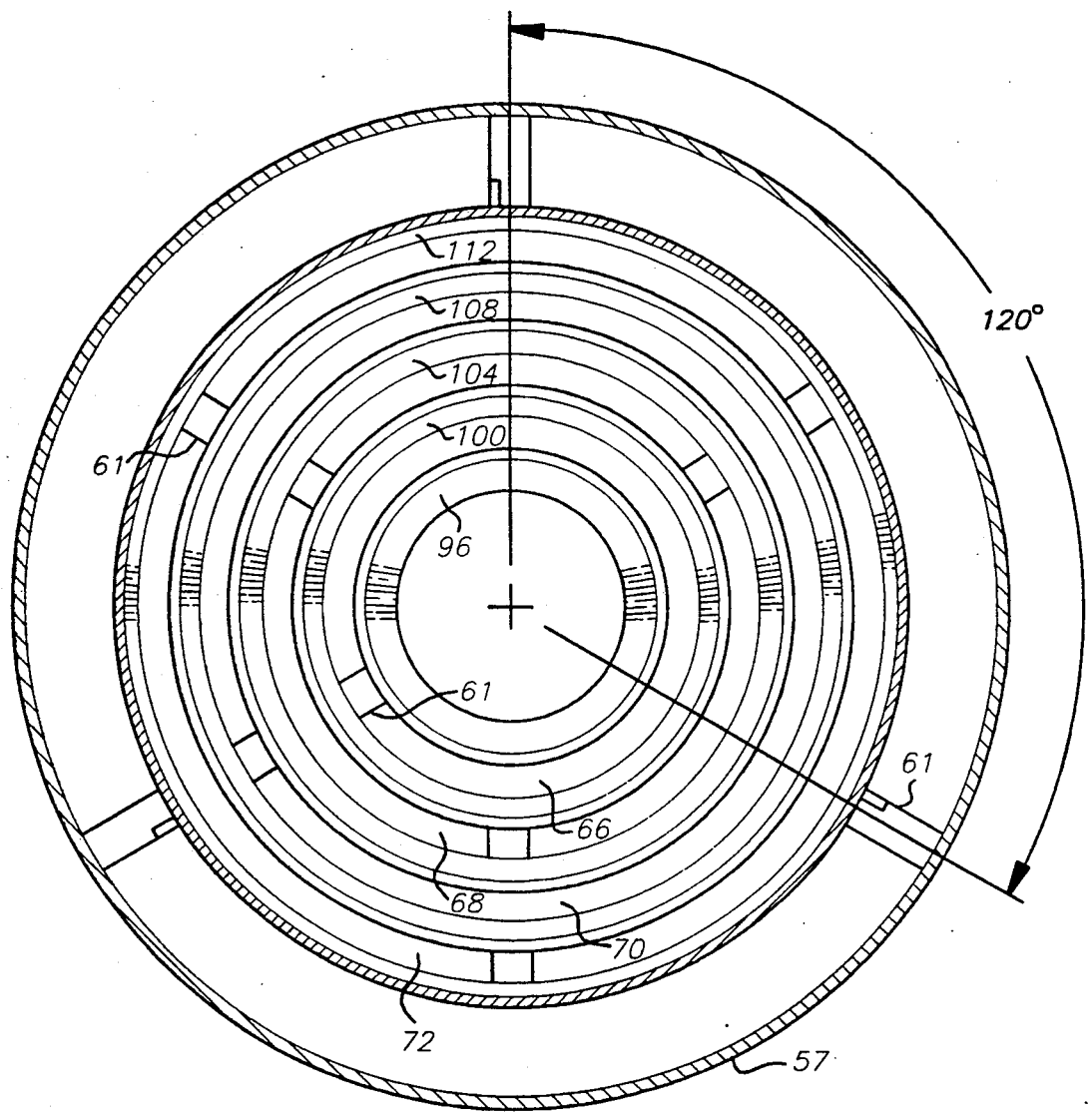
FIG. 9 is a cross-sectional view taken along lines 9—9 of FIG. 8.

The conical members are affixed to each other in such a way so that the large diameter region of one conical member is coupled to the small diameter region of another conical member, in gradually increasing diameters. For example, large diameter region 114 of conical member 104 is affixed to small diameter region 120 of conical member 108. Although alternative methods of affixing conical members together is acceptable, in the preferred embodiment, the conical members are welded together via a plurality of brackets 61, as illustrated in FIG. 9.

As can be seen in FIGS. 3 and 5, the large diameter region 114 of conical member 104 is smaller than the small diameter region 120 of conical member 109. The spacing in-between conical members 104 and 108 creates an annular discharge port 70, as illustrated in FIG. 2. Similarly, the spacing between conical members 96 and 100 creates annular discharge port 66, the spacing between conical members 100 and 105 creates annular discharge port 68, and the spacing between conical members 109 and 113 creates annular discharge port 72.

As described previously, the contaminated blast media 78 is composed of blast media 80 and contaminants 82. It is desirable to remove the contaminants 82 from the contaminated blast media 78 and recover clean blast media 80 for reuse.

As illustrated in FIGS. 1 and 3, the contaminated blast media 78 is entrained by the vacuum source 20 via an operator-controlled nozzle 24, the entrained contaminated blast media 78 subsequently being drawn by an upward vertical airflow 60 through the inlet port 54 into the cone 52. As described previously, the airflow rate will vary inversely with the quantity of media being carried. As the entrained contaminated blast media 78 moves upward from a small diameter section 62 near the bottom region 53 of cone 52 towards the large diameter section 64 near the top region 55 of cone 52, the entrained contaminated blast media 78 reaches different heights within cone 52 depending on the airflow rate. Due to the effects of gravity, the blast media 80 falls in a fountain shape, and falls through the plurality of annular discharge ports 66-72 where it is collected in hopper 14. While the blast media 80 falls and is discharged, the contaminants 82, such as paint and metal fragments, are carried upward by the airstream 60 to be discharged through the outlet port 56 to the dust collector 18.

With a low airflow rate, the entrained contaminated blast media 78 will not be carried very high within the cone 52. The media 80 falling in a fountain shape at a low air rate 88 therefore falls through the lower discharge ports, for example, discharge port 66. With a higher airflow rate, the entrained contaminated blast media 78 is carried higher within cone 52. As a result, the media 80 falling in a fountain shape at a higher airflow rate 90 will fall through multiple discharge ports, including some of the higher ports, for example, discharge ports 70, 68 and 66.

As further illustrated in FIG. 8, a target 74 is attached to cone 52 such that it is positioned in an upper region 76 of cone 52. The target 74 is aligned with the inlet port 54, thereby preventing blast media 80 from being discharged through outlet port 56. With a high airflow rate, the entrained contaminated blast media 78 strikes the target 74, the blast media 80 being deflected in a fountain shape while the contaminants 82 are knocked loose and drawn out of the cone 52 via outlet port 56.

In one embodiment, the target 74 is suspended in an upper region 76 of cone 52 by springs 123, such that the elevation of target 74 varies within cone 52 depending on the airflow rate and quantity of blast media 80 striking the target 74. In this embodiment, at least three springs are used, to ensure that the target 74 moves only in a vertical direction.

In an alternative embodiment, the target 74 is affixed to cone 52 in a fixed manner. In another alternative embodiment, the target 74 is affixed to cone 52 in such a way so that the elevation of target 74 within cone 52 may be adjusted. For example, the length that support rod 206 of FIGS. 11 and 12 extends into the cone and can be adjusted to place the target 74 at the desired height.

As illustrated in FIGS. 3 and 5, the angle of expansion 86 for integral cone 92 and cone 52 is selected to minimize turbulent airflow within cone 52 when in operation. In one embodiment, an angle of 7° is selected for the expansion angle 86 of integral cone 92, corresponding to the angle for the ideal expansion of gas. The slope of the walls of each conical member 96-113 will be the same as the selected angle of expansion 86 of integral cone 92. Since the cross-sectional diameter of cone 52 gradually increases, the vertical airflow 60 expands gradually, thereby minimizing turbulent flow along the walls of cone 52, thereby maximizing the efficiency of the separation process.

As further illustrated in FIG. 8, the inlet port 54 is affixed to cone 52 in a sealed relationship 84. The annular discharge ports 66-72 are spaced from inlet port 54, inlet port 54 being aligned with the axis of cone 52, such that, with a low airflow rate, the entrained contaminated blast media 78 falls back down into the inlet port 54 to be reintroduced into the cone 52 by an increase in the airflow rate, thus preventing contaminants 82 from being discharged through the discharge ports 66-72 under the condition of a low airflow rate. This process, wherein the entrained contaminated blast media 78 is drawn into cone 52 and then falls back into inlet port 54 due to a sudden decrease in airflow rate to be reintroduced due to an increased airflow rate, increases the effectiveness of the cleaning process, given that the effectiveness of separation is increased with the amount of time the blast media 80 is washed by the upward vertical airstream 60.

It will be appreciated by those skilled in the art, that as an alternative embodiment, the apparatus 50 for separating blast media 80 from contaminants 82 illustrated in FIG. 2 may be used alone or connected in series with another cone positioned for separating blast media from contaminants, namely, as the blast media 80 falls through the annular discharge ports 66-72 to be collected in hopper 14, the blast media 80 would be reentrained by vacuum source 20 to be introduced into a second conical cleaning section or cone, similar to cone 52 of FIG. 2.

Figure 12:
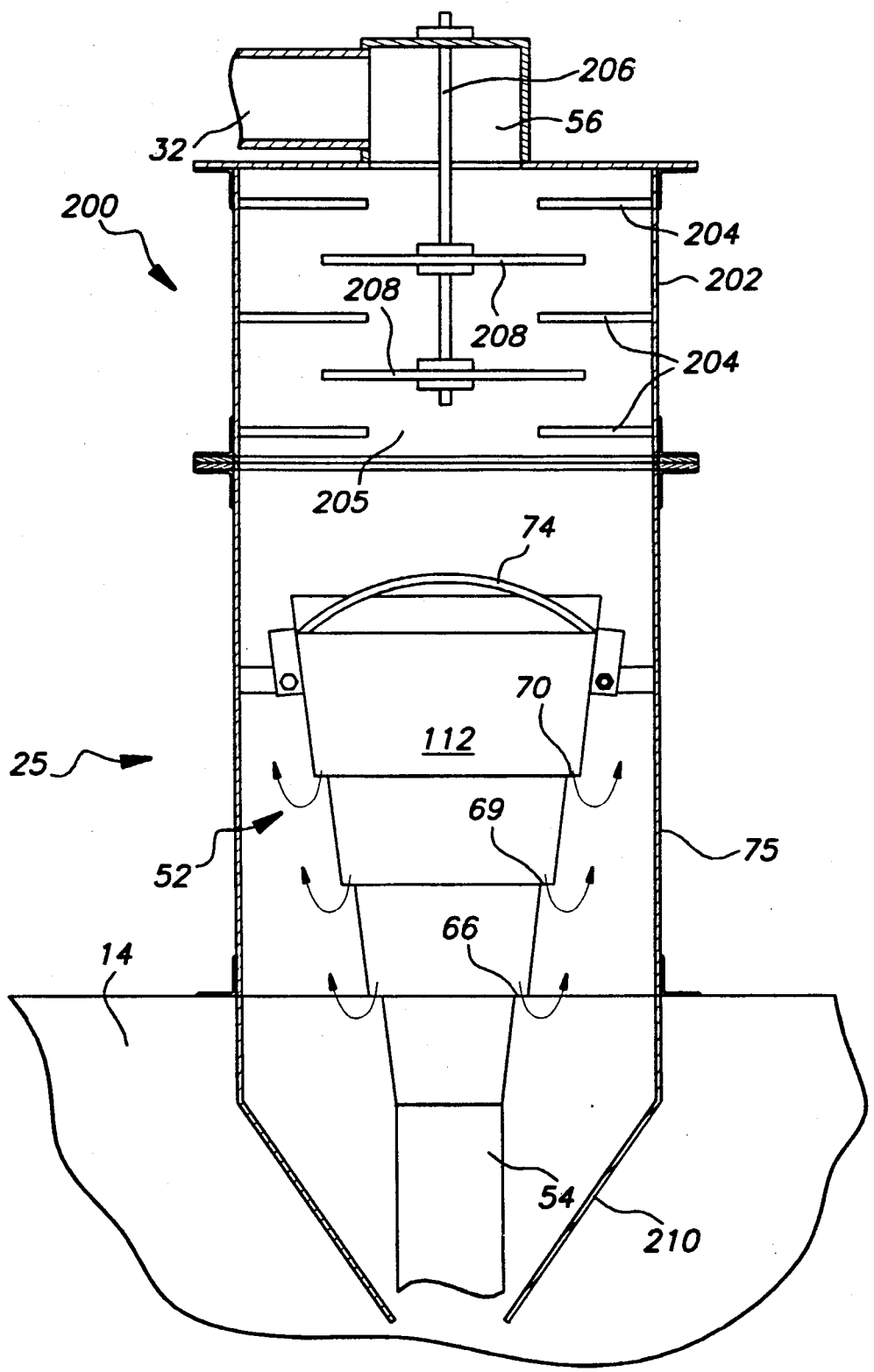
FIG. 12 is a side elevational view of a further alternative embodiment of the conical cleaning section.

As shown in FIG. 1, the target 74 can be substantially planar, and extend horizontally or, alternatively, as shown in FIGS. 8, and 12, it is concave. Having a concave target provides the advantage that blast media striking the target is deflected back towards the center of the conical section 52. As will be appreciated, the curvature of the concave target 74 can be selected to direct the abrasive blast media, much like a lens focuses light. Thus, the blast media striking the target 74 can be directed back towards the center of the stream to cross through the high velocity airflow section for increased air-washing and cleaning of the stream of blast media as it passes through the conical cleaning section.

Figure 11:
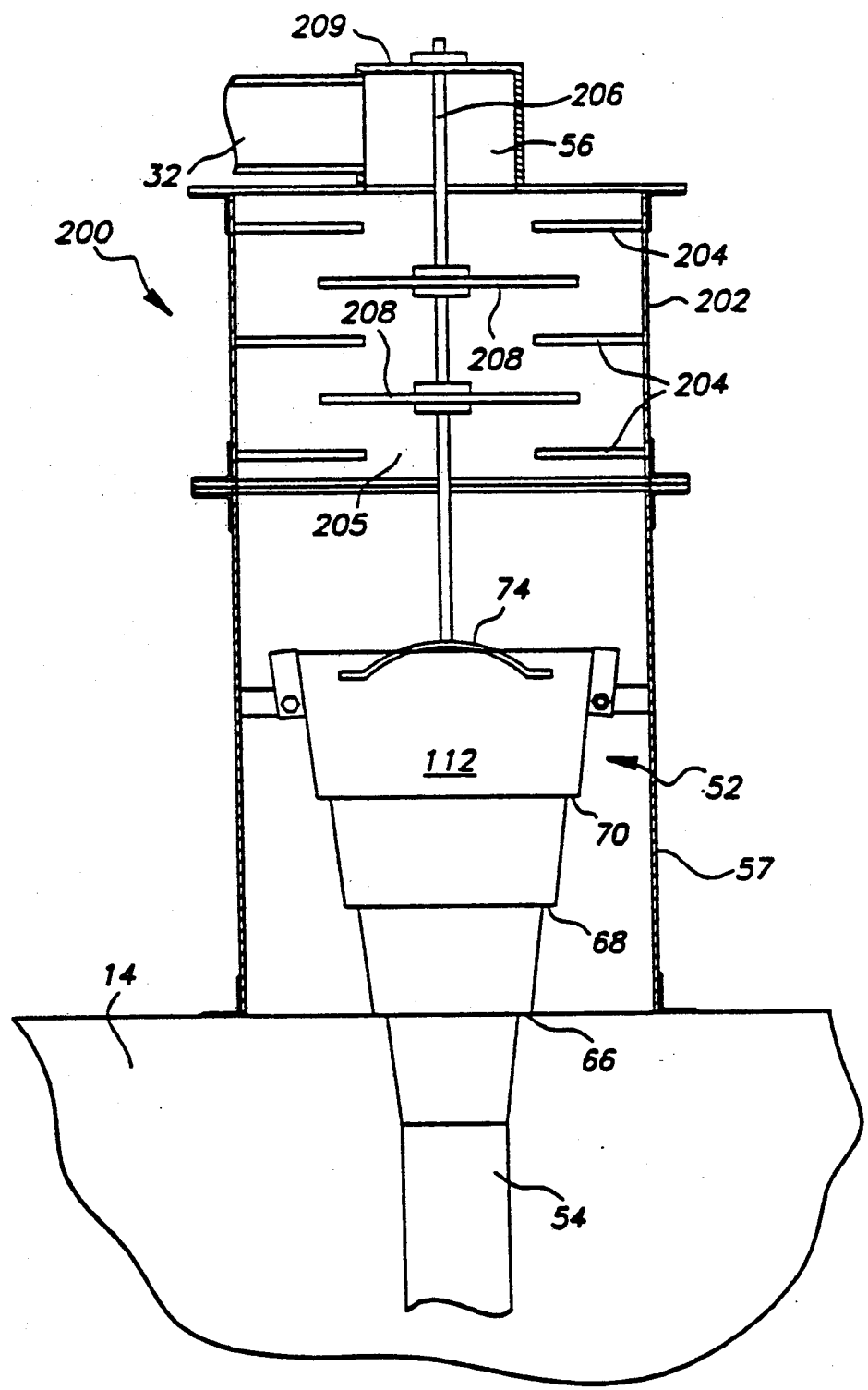
FIG. 11 is a side elevational view of an alternative embodiment of the conical cleaning section.

As shown in FIG. 11, the second cleaning stage 25 includes, in one embodiment, a baffle section 200 above the cone 52 and prior to the outlet 56. The baffle section 200 includes a housing 202 having annular rings 204 coupled to the housing thereof. The rings 204 are doughnut-shaped, having an aperture 205 in the central region thereof. A central support rod 206 is attached to an outlet support housing 208 and extends downward towards the top of cone 52. The target 74 is attached to the support rod 206, the target being supported in the center by the rigid rod 206 in this embodiment. The target 74 is smaller in diameter than the upper section of the cone 52 so that air escapes out of the cone by going around the target 74 and blast media falls out of discharge ports 66, 68, and 70 as has previously been described. One or more disks 208 are also attached to support rod 206. Each disk 208 is larger in diameter than the aperture 205 of the rings 204. In one embodiment, only a single disk 208 is provided. However, alternatively, a plurality of disks 208 may be used.

The baffle section 200 achieves further cleaning of the blast media and ensures that cleaned abrasive blast media does not exit out of the vacuum discharge port 56. As the air passes vertically upward through the baffle section 200, it experiences one or more 90° turns because the disks 208 are larger in diameter than the rings 204. The fines and other light particles being carried in the air remain entrained in the airstream and are carried out of the discharge port for collection in the dust collector 18. However, any abrasive blast media which remains entrained in the airstream will impact either a ring 204 or a disk 208. Because the disks 208 and the rings 204 overlap each other, there is not a straight line path from the cone 52 to the outlet port 56. Any abrasive blast media particles will be knocked out of the airstream by impacting either a disk 208 or a ring 204 within the baffle section 200.

If desired, the baffles 204 can include one or more apertures around the outer circumference where it attaches to the housing 202 so that any blast media particles which rest on top surface of the rings 204 may fall through the apertures and down into the hopper 14. As an additional alternative, the rings 204 can be at a slight incline, with a lower edge adjacent the wall and having large circumferential apertures along the wall so that blast media particles landing on the rings 204 will fall down the rings, against the housing 202 and through the apertures to enter the hopper 14. The target 74, rings 204 and disks 208 may be rubber lined on the bottom surface thereof for increased wear and resistance to impact by abrasive blast media.

The alternative embodiment of the conical cleaning section 52, illustrated in FIG. 11, is an exact replacement for that conical cleaning section as shown in FIG. 1, both conical cleaning sections having approximately the same outer dimensions. In one embodiment, the baffle section 200 is approximately 8 inches high with approximately 2-inch vertical spacing between the rings 204 and the disks 208. As will be appreciated, fewer or more rings or disks could be used, depending upon the needs of a particular cleaning apparatus.

FIG. 12 illustrates a further alternative embodiment of the conical cleaning section 52, having a baffle section 200 on the top thereof. The structure and operation of the baffle section 200 is similar to that as has been described with respect to FIG. 11. The conical cleaning section 52, however, is somewhat different in structure and operation. As can be seen from viewing FIG. 12, the target 74 is affixed to the upper end of the cone 52. The target 74 is circular and is attached to the walls of the uppermost cone section 112. In one embodiment, the target 74 is completely sealed with the inner surface of the walls of cone 52, preventing any air, fines, or blast media from exiting via the top of the cone 52.

Contaminated abrasive blast media 78 enters the cone 52 and, in many instances, will impact the target 74. The target 74, being sealed with the top of the cone 52, will not permit the flow of the airstream around the outer edges thereof. The air must therefore exit through discharge ports 66, 68, and 70. The vacuum airstream pulls the air with relatively high velocities out of the discharge ports, the abrasive blast media and fines being drawn together out of the discharge ports. As the blast media and fines are brought out of the discharge ports, the air velocity will suddenly decrease, based on the area increasing significantly in the housing 75 surrounding the cone 52. The abrasive blast media will therefore fall down into the hopper 14 with the fines being carried upward and out the outlet port 56 for collection in dust collector 18. A funnel 210 is preferably provided at a lower section of the conical cleaning section to direct the blast media to a desired portion of the hopper 14.

In a further alternative embodiment, the conical cleaning section as shown in FIG. 12 is used without a baffle section 200. Some tests have indicated that the change in air velocity, coupled with the exiting out of the discharge ports under the forced airstream, ensures that nearly all of the abrasive blast media will fall out of the airstream and down into the hopper 114 so that, in some embodiments, the baffle section 200 is not required.

The conical cleaning section 52 has the desired number of sections based on the velocity of the airstream. For a higher velocity, more sections are used. For example, in the embodiment of FIGS. 11 and 12, there are four cone members, but in another embodiment, five cone members are used. In alternative embodiments, six or more cone members are used because the airstream has a higher velocity.

A detailed description of the conical cleaning section is shown and claimed in an application entitled "CONICAL APPARATUS FOR CLEANING BLAST MEDIA," filed concurrently herewith and having common inventorship.

Referring back now to FIGS. 1 and 2, the air exiting from the second cleaning stage 25 via tubing 32 carries with it the contaminants 82 removed in the second cleaning stage 25. These contaminants 82 are removed from the air in the second dust collector 18. The air is drawn through the second dust collector 18 to the vacuum power source 20. Clean air is ejected by vacuum power source 20, all of the contaminants 82 being removed and collected by the abrasive blast cleaning apparatus and clean blast media being deposited in the blast vessel 12 for reuse.

As can be seen by viewing FIGS. 1 and 2, in one embodiment the second cleaning stage 25 is offset from the center of hopper 14 and, preferably is in one corner of the hopper 14. The second cleaning stage 25 is advantageously placed in the corner of the hopper 14 to permit a spreader, such as an automatic rake or rotating arm to spread the blast media evenly within the hopper 14. It has been found that the blast media, having a relatively steep angle of repose, often piles up in the hopper 14 and does not fill the corners properly. Therefore, in one embodiment, a spreader is provided in the upper portion of the hopper 14 to spread the blast media evenly throughout the hopper 14. The spreader may be any automatic spreader and, in one embodiment, one or more arms are pushed back and forth across the hopper by an air-driven piston. The arms have hinged rake members coupled thereto, the hinges permitting the rake members to bend when moving towards the cleaning section 25 but remain stiff when moving away from it, so that they carry blast media from one corner of the hopper 14 and evenly spread it throughout the entire hopper, when moving away from the cone but can flip up and move over blast media when being drawn towards the cone. Using a spreader thus significantly increases the volume of blast media that can be stored in the hopper 14. Of course, the conical cleaning section 25 may be in the center of hopper 14 and a spreader not used or, alternatively, a spreader may be used even with the conical cleaning section 25 in the center of the hopper 14.

An apparatus and method for cleaning contaminated blast media have been described herein. As will apparent, various structures may be constructed according to the teachings herein to provide improved cleaning of abrasive blast media. It is, of course, possible that two or more rotatable drums could be used in series, two or more conical cleaning sections 25 could be used in series or various combinations thereof. Similarly, the drum cleaning section 109 could be replaced with a conical cleaning section and vice versa, if desired. Other equivalent structures may be used to replace those specifically taught in the specification to provide the same result in the same way and thus fall within the scope of this invention as covered by the appended claims.

I claim:

1. An apparatus for recovering and cleaning contaminated particulate abrasive blast media for reuse, comprising:
   a vacuum system for entraining contaminated blast media from a work site in a transporting gas;
   a rotatable, cylindrical drum having cylindrical walls, said drum having solid wall section and an apertured wall section, the solid wall section being positioned forward of the apertured wall section;
   an inlet member coupled to a front region of said cylindrical drum, said inlet member being positioned for receiving contaminated blast media from an inlet pipe and depositing said contaminated blast media on said solid wall section of said rotatable drum;
   a blocking assembly positioned within said rotatable drum in said solid wall section, said blocking assembly including an air restriction member that restricts the airflow through a selected portion of the drum, thus creating an increased airflow velocity through the unrestricted portion of said rotatable drum;
   an outlet for air-entrained contaminants in a back region of said rotatable drum; and
   an outlet positioned below said apertured wall section for receiving cleaned blast media that passes through apertures in said apertured wall section of said rotatable drum, the apertured wall section being positioned aft of the solid wall section and the blocking assembly such that said blast media passes through said aperture after significant contaminants are removed by air-washing in said rotatable drum prior to exiting through said apertures.

2. The apparatus according to claim 1, further including a plurality of scoop members affixed to said solid wall member and extending along said solid wall member, said scoops positioned and shaped to transport said blast media from a lower region of said drum to an upper region of said drum and drop said blast media from said upper region of said drum so that it falls to a lower region of the drum through a high-velocity airstream for removing contaminants from said blast media, said air restriction member channeling a high-velocity airstream through a region of said drum that the blast media drops through.

3. The apparatus according to claim 2 wherein said scoops each include an angled portion extending towards an interior region of said drum, said angle being selected to ensure that blast media is dropped from said scoop as portions of said scoop passes between approximately the one o'clock and eleven o'clock positions within said drum to ensure that said blast media is dropped through a high-velocity airstream for cleansing said blast media.

4. The apparatus according to claim 1 wherein said air restriction member includes a flexible member, the flexible member bending under its own weight to leave an opening of a selected size in an upper region of said rotatable drum and being held by gravity in a generally vertical orientation in the lower region of said drum, thus providing an open air passage in an upper region of said drum and a restriction to airflow in a lower region of said drum such that airflow through said drum is channeled in a selected manner by said flexible member as said drum rotates.

5. The apparatus according to claim 4, further including a plurality of blocking assemblies within said rotatable drum, at least two of said blocking assemblies being positioned within said solid wall section and each of said blocking assemblies including a flexible member which selectively permits the passage of air through an upper region of said drum and selectively restricts the passage of air through a lower region of said drum.

6. The apparatus according to claim 5, further including a blocking assembly positioned at the entrance to said apertured wall section of said rotatable drum, said third blocking assembly being directly attached to a rotatable shaft extending through said drum for rotating said drum, there being a series of three blocking assemblies within said rotatable drum, the blast media being required to pass through each of said three blocking assemblies in series prior to entering said apertured wall section for exit from said rotatable drum.

7. The apparatus according to claim 1, further including a target member fixed within said inlet, said target member being positioned for direct impact with said blast media; and
   a shield member positioned at an opening of said inlet near a top region thereof for partially blocking the top entrance to said drum and knocking blast media into a lower region of said rotatable drum onto said solid wall portion of said rotatable drum.

8. The apparatus according to claim 1 wherein said solid wall section and said apertured wall section are removably attached for permitting each said sections to be separated from each other and replacement sections to be attached thereto to facilitate easy replacement or repair of either section of said rotatable drum.

9. The apparatus according to claim 1 wherein said outlet is at the back and at an upper end of said rotatable drum for ensuring that air-entrained fines exit from an upper portion of said outlet.

10. The apparatus according to claim 1, further including a plurality of baffles within said apertured wall section, each of said baffles having an opening therethrough for permitting blast media and particulate contaminants to pass through said opening, the opening of one baffle being radially offset from an opening in an adjacent baffle to ensure that said blast media and particulate contaminants are subjected to at least one-half of a rotation of said drum before passing through said plurality of baffles.

11. The apparatus according to claim 1, further including a tubing below said outlet receiving cleaned blast media, said tubing having an airflow therethrough which directs said blast media to a second cleaning station for further cleaning of said blast media.

12. An apparatus for entraining, transporting and cleaning contaminated particulate abrasive blast media for reuse, comprising:
    an operator-controllable vacuum nozzle having a flow of air drawn into it, said vacuum airflow being provided to entrain contaminated blast media under the manual control of an operator;
    a first stage cleansing assembly including a rotatable drum that is suspended from a frame member, said flow of air going through said first cleansing stage to remove contaminants from said blast media and an outlet positioned below said rotatable drum and receiving blast media as it exits from said drum;
    a first tubing extending from said first stage cleansing assembly to a first dust collector for removing airborne fines from said flow of air that have been separated from said contaminated blast media in the first cleansing stage;
    a second tubing extending from said first dust collector to said outlet to transport blast media exiting from said first cleansing stage in said flow of air, said air being once cleaned air by passing through said first dust collector;
    a second cleansing stage coupled to said tubing, said blast media entering said second cleansing stage entrained within said flow of air for removing additional contaminants from said blast media;
    a third tubing extending from said second cleansing stage to a second dust collector for removing airborne fines a second time from said flow of air; and
    a vacuum source coupled to the outlet of said second dust collector, said vacuum source providing the vacuum flow of air for entraining the blast media from said operator-controlled vacuum nozzle in a series pass through said first stage cleansing assembly, said first tubing, said first dust collector, said second tubing, said second cleaning stage, said third tubing and said second dust collector.

13. The apparatus according to claim 12 wherein said operator manually entrains contaminated blast media with said vacuum nozzle, thus randomly varying the airflow rate and blast media flow rate through said first cleansing assembly and said second cleansing assembly.

14. The apparatus according to claim 12, further including a connection from said outlet to said first tubing that is offset from a top portion of said tubing by a selected angle, said offset angle being selected to ensure that there is always an open space for air in said first tubing based on the angle of repose of the particular blast media being entrained in the vacuum.

15. The apparatus according to claim 12 wherein said rotatable drum is suspended from a support assembly that has an adjustable height, said rotatable drum having the back end higher than the front end such that blast media is carried by gravity from the front end towards the back end and the angle of said drum being variable by changing the support assembly attachment point.

16. The apparatus according to claim 12 wherein said rotatable drum includes:
    a solid wall section and an apertured wall section; and
    a plurality of blocking assemblies within said solid wall section, said blocking assemblies including a flexible member for selectively restricting airflow through a lower region of said drum and selectively providing an opening for increased airflow in an upper region of said drum.

17. The apparatus according to claim 12 wherein said second stage includes:
    a conical cleaning section having a gradually increasing diameter in a vertically upward direction;
    an inlet port to said conical cleaning section; and
    a plurality of discharge ports positioned along a wall section of said cone, said discharge ports being spaced a selected distance from said inlet port.

18. A method of cleaning contaminated blast media comprising:
    entraining blast media having contaminants therein in a negative pressure, vacuum induced airstream, the airflow rate within said airstream being randomly variable depending upon the quantity of blast media entrained therein at various locations within said entraining air;
    passing said blast media in said entrained air into a first cleaning stage having a rotatable drum;
    scooping blast media from a lower region of said rotatable drum and carrying it towards an upper region of said rotatable drum by rotation of said drum;
    dropping blast media from an upper portion of said drum into a cleansing airstream for removing contaminants from said blast media;
    restricting the flow of cleansing air in one region of said rotatable drum simultaneously with selectively providing an increased opening in another region of said rotatable drum for, permitting cleansing air to pass more freely through said one region of said rotatable drum than through a restricted region of said rotatable drum; and
    dropping said blast media out of said rotatable drum through apertures in said rotatable drum to an outlet.

19. The method according to claim 18, further including the steps of:
    transporting said blast media from the outlet of said rotatable drum into a tubing to a second cleaning stage for removing additional contaminants from said blast media.

20. The method according to claim 18, further including:
    bending segments of a flexible member over under the force of gravity to selectively provide said open passage; and
    maintain segments of said flexible member generally vertical under the force of gravity to provide said restriction.

* * * * *

UNITED STATES PATENT AND TRADEMARK OFFICE
CERTIFICATE OF CORRECTION

PATENT NO.    :   5,195,640

DATED         :   March 23, 1993

INVENTOR(S)   :   Glenn A. Seaverns

It is certified that error appears in the above-identified patent and that said Letters Patent is hereby corrected as shown below:

In column 15, claim one, line 48, after "having" and before "solid", please insert --a--.

In column 18, claim 18, line 47, after "for", please delete ",".

Signed and Sealed this

Twenty-first Day of December, 1993

Attest:

BRUCE LEHMAN

*Attesting Officer*     *Commissioner of Patents and Trademarks*